(No Model.)  
C. ELKIN.  
ACCOUNT CARD.  
2 Sheets—Sheet 1.

No. 570,249. Patented Oct. 27, 1896.

(No Model.)

2 Sheets—Sheet 2.

C. ELKIN.
ACCOUNT CARD.

No. 570,249. Patented Oct. 27, 1896.

*Fig. 2.*

WITNESSES:

INVENTOR:
Chas Elkin
BY Henry Calvert
ATTORNEY.

UNITED STATES PATENT OFFICE.

CHARLES ELKIN, OF JERSEY CITY, NEW JERSEY, ASSIGNOR TO THE SINGER MANUFACTURING COMPANY, OF NEW JERSEY.

ACCOUNT-CARD.

SPECIFICATION forming part of Letters Patent No. 570,249, dated October 27, 1896.

Application filed May 4, 1896. Serial No. 590,107. (No model.)

*To all whom it may concern:*

Be it known that I, CHARLES ELKIN, a subject of the Queen of Great Britain, residing at Jersey City, in the county of Hudson and State of New Jersey, have invented certain new and useful Improvements in Account-Cards, of which the following is a specification, reference being had therein to the accompanying drawings.

My invention has for its object to provide an account-card for the use of bicycle and sewing-machine companies or other corporations or firms making sales of machines or other articles on leases, by which it is understood that the articles sold are to be paid for in instalments and that the titles to said articles are to remain with the sellers until the purchase-money has been fully paid.

To this end my account-card consists of two separable portions having similar headings. One of these portions, which is to be sent to the principal office or place of business of the company, with its heading properly filled out, is divided into spaces or sections, which are preferably numbered from the top downward. The other portion of the card, which is to be retained at the agency, and which has its heading filled out to correspond to the filled-out heading of the other part of the card, is divided into coupons which are preferably made removable by lines of perforations, these coupons being preferably numbered from the bottom of the card upward, the numbers of the coupons corresponding to the numbers of the spaces or sections of the portion of the card which is to be kept on file at the central office of the company, the said coupons being of approximately the size and shape of such spaces or sections. The headings of the two-part divisible account-card will in practice preferably have a corresponding sale or card number, and the spaces or sections and the corresponding coupons of the two parts of the card will preferably be provided with the same sale or card number as appears in the said headings.

In the accompanying drawings, Figure 1 represents my improved account-card in blank form and undivided. Fig. 2 represents the same in a divided condition with the headings filled out and with one of the coupons removed from the agency part of the card and attached to the central-office part thereof.

A denotes the central-office portion of the card, provided with the heading $a$, which is to be properly filled out, as indicated by Fig. 2, and below which heading said central-office portion is divided into spaces or sections $a'$, preferably consecutively numbered from the top downward, as shown.

B denotes the agency portion of the card, which is preferably made readily detachable from the central-office portion of the card by a row of perforations, or by an otherwise weakened line, and the heading $b$ of the said agency portion of the card is in practice to be filled out to correspond to the heading of the central-office portion thereof. Below the said heading $b$ the agency portion of the card is divided into coupons $b'$, preferably consecutively numbered from the bottom upward, as shown, and also preferably made readily detachable by lines of perforations or otherwise. Both headings will in practice preferably have a corresponding sale or card number $c$, and all the coupons and sections in both portions of the card will also preferably be correspondingly numbered.

In the use of my improved sale-card when a sale is made at an agency the headings of both portions of the card are correspondingly filled out by the agent, and the central-office portion is then detached from the agency portion and forwarded to its proper destination. If a cash payment is made at the time of the sale, this can be noted on coupon No. 1, and the said coupon can then be detached from the agency part of the card and secured, as by mucilage, to the correspondingly-numbered space of the central-office part of the card before the same is sent into the central office. As the instalment payments are received at the agency from time to time the coupons $b'$ are properly filled out and forwarded to the central office, where they will be attached to their appropriate and correspondingly-numbered spaces $a'$ of the central-office part of the card, and by this means the condition of the account for a particular machine or other article can be readily ascertained at any time at a glance by an inspection of the said central-office portion of the card, while the numbers of the coupons which have been detached from the agency part to the card will at all times indicate at the agency what the condition of the account of the purchaser is.

Having thus described my invention, I claim and desire to secure by Letters Patent—

An account-card consisting of two parts one of which is to be detached from the other, and which two parts are provided with corresponding headings, one part being divided into spaces or sections and the other part being divided into removable coupons corresponding to the said sections, the said sections and coupons being provided with corresponding consecutive numbers, the said consecutive numbers of said sections into which one part of said card is divided running from the top downward, and the said coupons into which the other part of said card is divided running from the bottom upward.

In testimony whereof I affix my signature in presence of two witnesses.

CHARLES ELKIN.

Witnesses:
PHILIP DIEHL,
J. G. GREENE.